United States Patent
Gorti et al.

(10) Patent No.: US 8,384,743 B2
(45) Date of Patent: Feb. 26, 2013

(54) LINKING AND BROWSING MEDIA ON TELEVISION

(75) Inventors: Sreenivasa Gorti, Austin, TX (US); Dinesh Nadarajah, Austin, TX (US); Peter Lowrie, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 374 days.

(21) Appl. No.: 11/400,345

(22) Filed: Apr. 6, 2006

(65) Prior Publication Data

US 2007/0250848 A1  Oct. 25, 2007

(51) Int. Cl.
G09G 5/00 (2006.01)
H04N 5/445 (2011.01)
G06F 3/00 (2006.01)
G06F 13/00 (2006.01)
H04N 7/173 (2011.01)

(52) U.S. Cl. ............ 345/635; 725/51; 725/37; 725/110
(58) Field of Classification Search .............. 725/51, 725/109, 37, 110
See application file for complete search history.

(56) References Cited

U.S. PATENT DOCUMENTS

| | | | | |
|---|---|---|---|---|
| 5,703,795 A * | 12/1997 | Mankovitz | ...... | 715/721 |
| 5,990,927 A * | 11/1999 | Hendricks et al. | ...... | 725/132 |
| 6,002,393 A * | 12/1999 | Hite et al. | ...... | 715/719 |
| 6,177,931 B1 * | 1/2001 | Alexander et al. | ...... | 725/52 |
| 6,243,145 B1 | 6/2001 | Schlarb et al. | | |
| 6,275,989 B1 | 8/2001 | Broadwin et al. | | |
| 6,760,916 B2 | 7/2004 | Holtz et al. | | |
| 6,816,628 B1 * | 11/2004 | Sarachik et al. | ...... | 382/285 |
| 6,907,574 B2 | 6/2005 | Xu et al. | | |
| 7,505,605 B2 * | 3/2009 | Rhoads et al. | ...... | 382/100 |
| 2002/0080163 A1 | 6/2002 | Morey | | |
| 2002/0120934 A1 * | 8/2002 | Abrahams | ...... | 725/60 |
| 2002/0188959 A1 | 12/2002 | Piotrowski | | |
| 2003/0051252 A1 | 3/2003 | Miyaoku et al. | | |
| 2003/0145331 A1 * | 7/2003 | Escobar et al. | ...... | 725/110 |
| 2003/0220918 A1 * | 11/2003 | Roy et al. | ...... | 707/3 |
| 2005/0002647 A1 * | 1/2005 | Girgensohn et al. | ...... | 386/69 |

(Continued)

FOREIGN PATENT DOCUMENTS

EP 0848554 6/1998
EP 0941607 9/1999

(Continued)

OTHER PUBLICATIONS

"International Application Serial No. PCT/US07/08684, International Search Report mailed Jan. 16, 2008", 4 pgs.
"International Application Serial No. PCT/US07/08684, Written Opinion mailed Jan. 16, 2008", 7 pgs.

(Continued)

*Primary Examiner* — Kee M Tung
*Assistant Examiner* — Carlos Perromat
(74) *Attorney, Agent, or Firm* — Guntin & Gust, PLC; Jay H. Anderson (57) ABSTRACT

Techniques for linking and browsing media on a television (TV) are provided. A selected program, which is associated with a channel of the TV, is detected and additional content, which is associated with that channel and/or the selected program, is dynamically acquired from one or more external sources. The additional content is formatted as links and simultaneously presented within a display of the TV along with the selected program that continues to play on the TV. Furthermore, activation of any link results in the additional content being dynamically acquired and presented within the display.

14 Claims, 7 Drawing Sheets

U.S. PATENT DOCUMENTS

| | | | |
|---|---|---|---|
| 2005/0086692 A1* | 4/2005 | Dudkiewicz et al. | 725/46 |
| 2005/0086700 A1* | 4/2005 | Tachikawa | 725/112 |
| 2005/0278729 A1 | 12/2005 | Lamkin et al. | |
| 2008/0060036 A1* | 3/2008 | Cox | 725/110 |

FOREIGN PATENT DOCUMENTS

| | | |
|---|---|---|
| EP | 1066560 | 1/2001 |
| WO | WO-0165833 A1 | 9/2001 |
| WO | WO-02/39289 | 5/2002 |
| WO | WO-2007114956 A2 | 10/2007 |

OTHER PUBLICATIONS

Bove, JR., V. M., et al., "Will Anyone Really Need a Web Browser in Five Years?", *Proceedings of 2000 Montreux World Television Forum*, http://web.media.mit.edu/~vmb/papers/Bove-Montreux2000.pdf,(2000),5 pgs.

Braun, Norbert, et al., "Using Sonic Hyperlinks for Web-TV", *International Conference on Auditory Display (ICAD '98)*, http://www.icad/org/websiteV2.0/Conferences/ICAD98/papers/BRAUN.PDF,(1998),1-10.

\* cited by examiner

LINKING AND BROWSING MEDIA ON TELEVISION

FIELD

This application relates to media processing, and more specifically to techniques for linking and browsing media on television (TV).

BACKGROUND

Today's television (TV) experience is essentially linear; meaning that a user watching a particular channel is presented with time-sequenced information for that channel. Non-linearity may be introduced by switching channels; thereby, moving to usually completely unrelated content. Efforts to group content together, such as by organizing a theme within channel guides only identify a very loose correlation between such content.

Furthermore, current Interactive TV (ITV) may provide embedded links in a vertical blanking interval (VBI), but this contains only one link that takes the viewer to that content identified by that link.

Thus, it is desirable to permit a TV viewer to experience information in a non-linearity fashion and to consume that information in a variety of convenient manners.

BRIEF DESCRIPTION OF DRAWINGS

The present disclosure is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
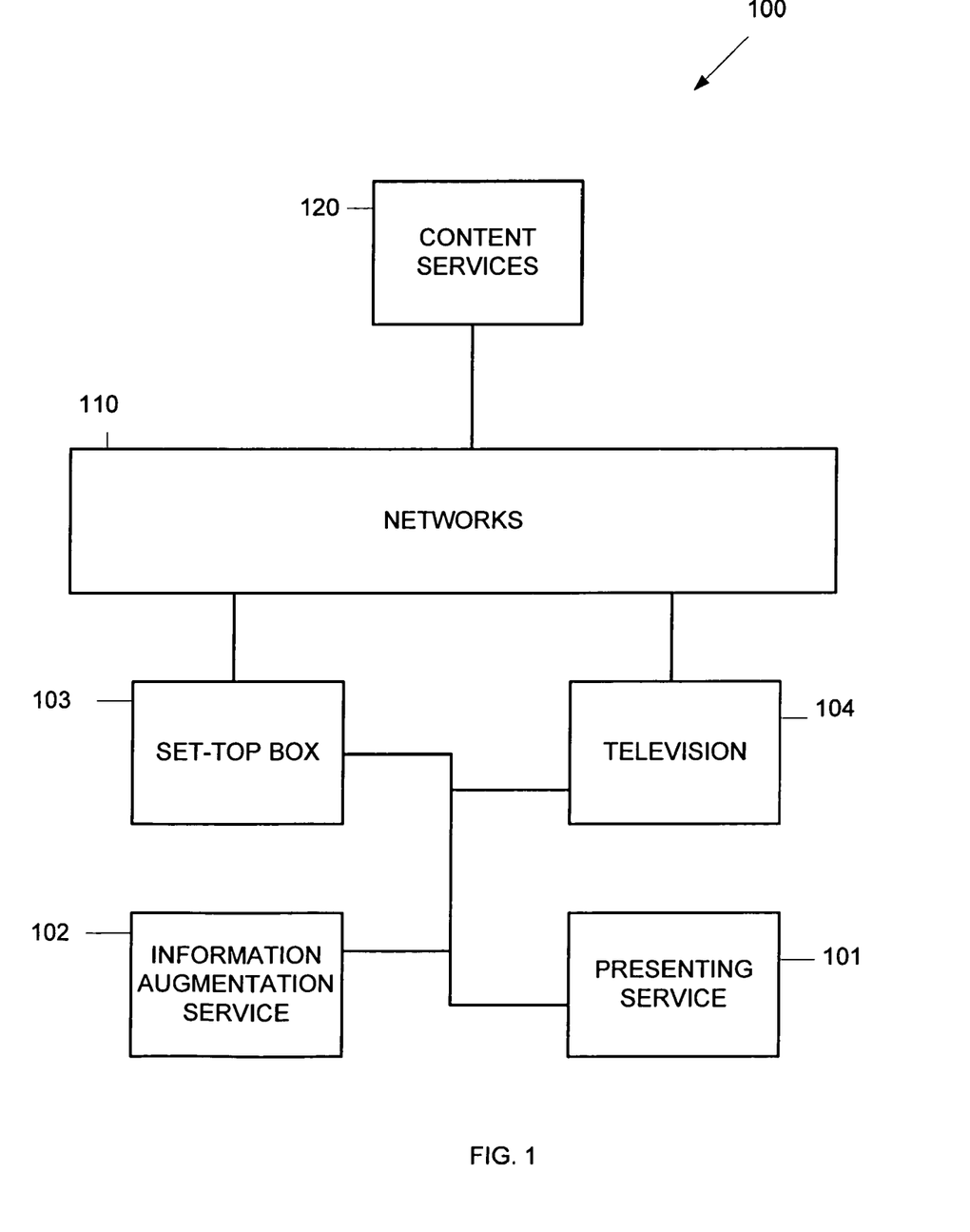
FIG. 1 is a diagram of a linking and browsing system, according to an example embodiment of the disclosure.

FIG. 1 is a diagram of a linking and browsing system 100, according to an example embodiment of the disclosure. The linking and browsing system 100 is implemented in a machine-accessible medium and is operational over a network. The network may be wired, wireless, or a combination of wired and wireless.

The linking and browsing system 100 includes a presenting service 101 and an information augmentation service 102. According to an embodiment, the linking and browsing system 100 may also include a set-top box (STB) device 103. The components 101-103 interact with one another and drive presentations viewed within a display of a television (TV) 104. The various interactions described herein and below use one or more networks 110 to communicate with content services 120 for purposes of dynamically and in real time acquiring additional content, which augments programming that may be playing on the TV 104. That is, content related to a current program playing on the TV 104 may be dynamically captured in real time and presented simultaneously with the current program within a display of the TV 104. The components 101-103 and the various interactions will now be discussed in turn.

The program that is being augmented with additional content is not pre-tagged to identify or assimilate information included within that program. That is, the stream associated with the program is not prefabricated and intelligently tagged. So, legacy programming or existing programming that is devoid of any special codes or tagging may benefit from the teachings presented herein and below. It is noted that with each of the discussed embodiments presented herein with respect to the remaining FIGS. 1-7 the programming being augmented is not pre-tagged; or stated another way is untagged.

The presenting service 101 formats and arranges presentations within the display of the TV 104. An example arrangement or presentation is shown and discussed below with respect to FIG. 5. One or more areas or frames within the display may play video or multimedia while other areas of frames may present still hypertext links, images, graphics, etc. The size and arrangement of the frames, which are presented within the display, are configurable. The presenting service 101 may be used to populate and to manage the presentations or frames.

According to an embodiment, the presenting service 101 visually formats the display of the TV 104 to simultaneously present the playing of a current program tuned or being played on the TV 104 along with links that identify additional content related to the current program. The links when activated acquire and play the additional or related content.

In order for the presenting service 101 to acquire the additional content to present with a current program within the display, the presenting service 101 interacts with the information augmentation service 102.

The information augmentation service 102 monitors selections being played on the TV 104. According to an embodiment, the information augmentation service 102 is a network-based service that is independent of any particular STB 103, TV 104, or viewer. The information augmentation service 102 interacts with other processes executing on a viewer's STB 103 to determine a particular current channel for the viewer that is tuned on the TV 104 and other related metadata. The information augmentation service 102 then interacts with a provider of that current channel or other external services to acquire additional content using that metadata and simultaneously provides the additional content to the presenting service 101.

According to still another embodiment, the information augmentation service 102 executes as software instructions on a set-top-box (STB) 103 interfaced to the TV 104. The STB 103 may be a cable device, a satellite device, a digital video recorder (DVR), a media server, a computer, or any other device capable of being interfaced the TV 104. In some cases, the information augmentation service 102 may be executing on a device that is remote from the TV 104 and is therefore located over a network 110. Therefore, the information augmentation service 102 does not have to be physically resident on a device that is proximate to the TV 104.

The information augmentation service 102 receives an instruction for augmenting a current or desired program with additional content. The receipt of this instruction may occur in a variety of ways. For example, a remote control associated with the TV 104, the STB 103, or a remote associated with both the TV 104 and STB 103 may be used by a viewer of the TV 104 to request the additional content. A special key or button on the remote (e.g., "info" button) may be activated by a viewer when a particular program on a currently tuned channel is playing on the TV 104.

Upon receipt of the request for the additional content, the information augmentation service 102 gathers metadata about the current program being played on the TV. In other words, a context of a program being played is captured. So, if the current program is the seventh game of the World Series in Major League Baseball (MLB), the information augmentation service 102 may record the inning of the game (assuming it this is provided in a metadata stream with the game), the channel for which the game is being played, the teams playing, the current time, and/or the current date. The context information, which is assembled in the metadata, may be specific to the current program, specific to the devices (STB 103 and/or TV 104); specific to the viewer, and/or specific to the channel provider that is supplying the current program.

Essentially, the information augmentation service 102 uses the metadata to construct a search query. The query is then externally submitted over one or more networks 110 to content services 120 for purposes of acquiring additional content related to the search query. The search query embodies contextual information that is associated with the current program being played on the TV 104.

In an embodiment, the information augmentation service 102 directly contacts a World-Wide Web (WWW) portal or service over the Internet. The WWW service is associated with the channel provider, who supplies the current program that is playing on the TV 104, when the information request was received by detecting the current program and current channel for the TV 104 at the time of the information request. The search, in this example, may be viewed as metadata, which may be expected by a channel provider service for purposes of returning context sensitive and related information/content for the current program.

According to an embodiment, the information augmentation service 102 may also contact other information sources or content services 120 that are not directly provided by or associated with the channel provider service, who is supplying the current program playing on the TV 104. Thus, a variety of content services 120 may be consulted and searched via the metadata, which is dynamically assembled by the information augmentation service 102.

The results of the searching are returned and processed by the information augmentation service 102. The returned answer set may be filtered, ranked, and descriptive information supplied for each piece of content. Moreover, the answer set may include a variety of media types, such as audio, video, graphics, images, text, or various combinations of the same (multimedia). The information augmentation service 102 may download the content, cache the content to memory associated with the STB 103, or may leave the content at its source, which is external to the local environment of the TV 104.

Each piece of content returned from the context-sensitive searching is assigned a link and descriptive information by the information augmentation service 102. The links are then supplied to the presenting service 101, and the presenting service 101 alters the presentation of the display to provide a viewer an experience in which the current program continues to play and the additional and related content is simultaneously presented in a configured area or frame of the display.

The viewer may then use a remote control device to select a desired piece of content. Upon selection of a particular piece of content, the information augmentation service 101 acquires the selected piece of content from memory, storage, or externally acquires it over the network 110 from one or more content services 120 who have it.

According to an embodiment, the selected piece of content is a video and the information augmentation service 101 uses an Internet Protocol (IP) to stream the video from a content service 120 over the network 110 (Internet) to a location within the display that was originally occupied by the current program. The current program may then be minimized and may continue to play within a different area of the display presentation. Alternatively, the current program may stop playing or may be paused and a link may be displayed for reactivating the current program when desired by the user.

As a further illustration of the linking and browsing system 100 consider the following example scenario. A viewer has a TV 104 including a STB 103 (e.g., DVR), both the TV 104 and the STB 103 may be controlled and managed via a remote control device. The STB 103 includes a variety of services including the presenting service 101 and the information augmentation service 102. An "info" button on the remote control activates a feature of the information augmentation service 102 that dynamically augments a current program with additional content from a variety of sources.

In continuing with the present example, the viewer may be watching a television movie, such as "The Rookie." The movie is played on the FOX® network. After an elapsed time of about an hour into the movie, the viewer activates the "info" button. Once activated, the information augmentation service 102 formulates a variety of contextual information as metadata. Some context information may include the name of the movie, the name of the viewer, an identifier for the STB 103, the elapsed time into the movie (1 hour), the television carrier service (e.g., AT&T, etc.). The metadata is then submitted over the network 110 to one or more content services 120 that may be directly identified by FOX or may be unrelated to FOX. The results of the query is a variety of related and additional content that is context sensitive, such as current baseball games being played on other channels, video archived classic baseball games, website links to information about the movie and the characters, archived television shows that have referenced the movie or clips that reference the movie, geographic maps to locations depicted within the movie, and other related information. The additional content is formulated as descriptive hypertext links and supplied to the presenter service 101. The presenter service 101 then dynamically formats the presentation within the display to include the formatted links and simultaneously continues to play the Rookie on the TV 104 display. The viewer may then activate one of the links and the presenter service 101 dynamically alters the presentation to acquire the activated content and to pause or relocate the movie.

The linking and browsing system 100 dynamically acquires additional content that is related in context to a current program playing on a TV 104. The related content is dynamically presented for selection within a display of the TV simultaneously with the current program. In some cases, the channel provider may provide content services 120 that specifically provide related information for its programs. In other cases, different content services 120 may be consulted for some of the additional content. In fact, broad and generic Internet-based searches may be dynamically launched in the background by the information augmentation service for purposes of acquiring additional and related content to a current program playing on the TV 104.

It is now understood, how a viewer's TV experience may be altered to provide a real-time and dynamic environment in which on demand context sensitive content, which is related to what is being viewed on the TV 104, may be dynamically delivered to a viewer's STB 103 or TV 104 on demand in an integrated fashion.

Figure 2:
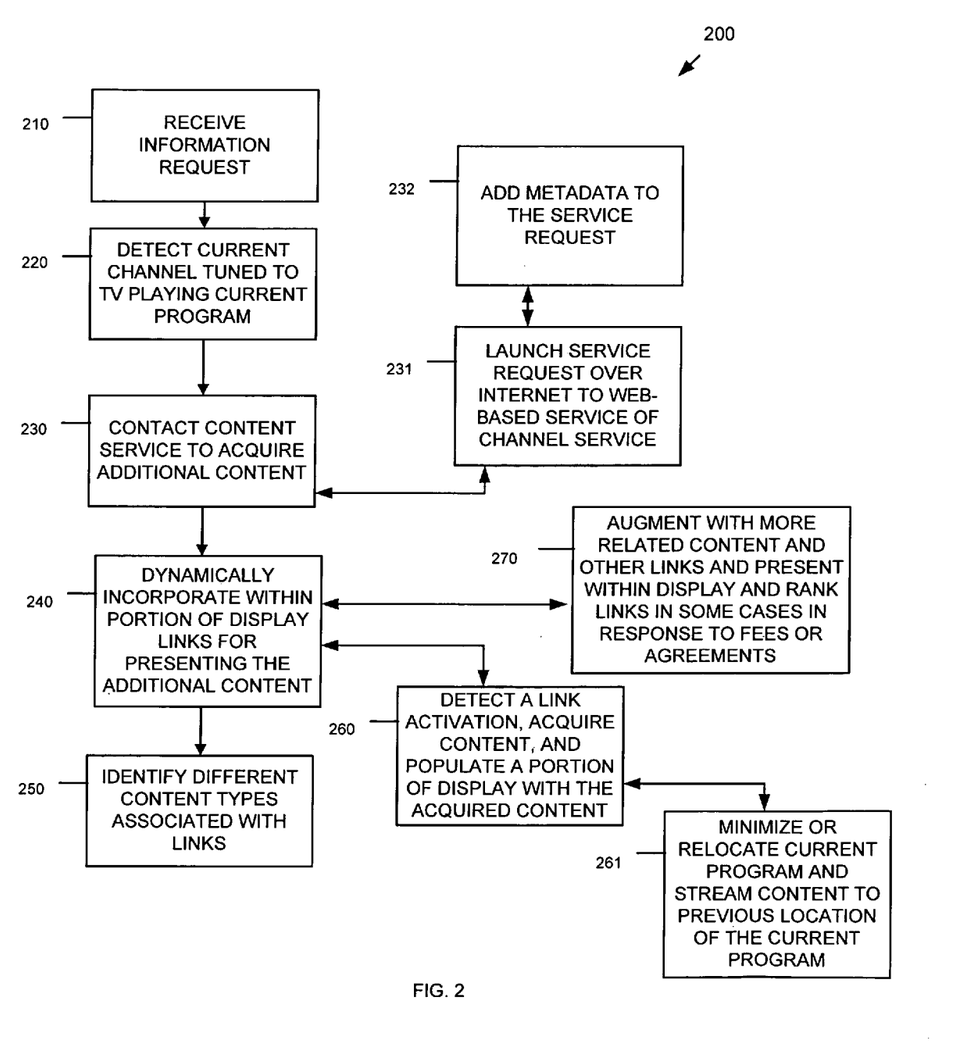
FIG. 2 is a diagram of method for linking and browsing media within display of a television (TV), according to an example embodiment of the disclosure.

FIG. 2 is a diagram of method 200 for linking and browsing media within display of a television (TV), according to an example embodiment of the disclosure. The method 200 (hereinafter referred to as "context delivery service") is implemented in a machine-accessible and readable medium and is operational over a network. The network may be wired, wireless, or a combination of wired and wireless. In an embodiment, the context delivery service may be implemented in the linking and browsing system 100 to perform various aspects of the presenting service 101 and the information augmentation service 102.

The context delivery service is designed to be activated by a command received from a viewer. One technique for activating the context delivery service is a reserved button on a remote control device that given the proper state contacts to wakes up the context delivery service when that button is activated by a viewer. The processing of the context delivery service may reside on local devices that are directly interfaced to a particular viewer's television or may reside externally over a network, such that the context delivery service is capable of being processed locally or remotely.

Accordingly, at 210, the context delivery service receives an information request. The information request activates or wakes up the context delivery service for processing. Once activated and after receiving the instruction for processing, the context delivery service detects, at 220, a current channel tuned on the television of a viewer and acquires programming information related to that channel. That is, a programming guide channel or existing memory within a set-top box (STB) may be able to supply the context delivery service with information about what is playing on the current channel (current program playing on the current channel).

At 230, the context delivery service contacts a channel provider associated with the current channel to acquire additional content related to the current program being played on the TV of the viewer. According to an embodiment, at 231, the context delivery service may achieve this by contacting a WWW service or portal associated with the current channel provider over the Internet. In fact, each channel provider may have such a site that supplies dynamic and real time additional content when queried. The name of the site may be standardized, such that if the name of the channel provider is known, then the name of the site is easily constructed. Policies may also be used to define the format of a search request for additional content.

In some cases, at 232, the context delivery service may add metadata to the service request made to the current channel provider. The metadata supplies a specific context or communicates a desired context for which additional information or content is being requested. The metadata may include a variety of information, such as, by way of example only, an identifier for the current program, a current date and time, a current elapsed time into the playing of the current program (e.g., this may be useful if the current program had been recorded and is being replayed by a viewer on the TV or with video on demand programming), a profile of the viewer, a profile of the viewer's TV, an identity of the viewer, and identity of the TV, and identity of a STB associated with the TV, an identity of the TV service provider (e.g., AT&T, etc.), a current geographic location of the TV or viewer, and the like. The profile may also be represented in anonymous fashion or manner as an anonymized profile to hide the true identity of the viewer. So, preference information maybe captured and the identity or anonymity of the viewer preserved.

At 240, the context delivery service dynamically incorporates, within a portion of the TV's display, links for presenting or acquiring additional content that is related to the current program playing on the TV's display. The additional content can be identified, at 250, in a variety of media formats, such as but not limited to, video on demand content, a Universal Resource Identifier (URI) or Universal Resource Locator (URL), personalized content related to a personal multimedia store of the viewer, and a streaming piece of content located over the Internet.

As an example of additional related content that is simultaneously presented with a current program being viewed may be as follows. A viewer is watching CNN®; the current program of CNN® shows a short clip of the Oscars® Awards from a previous night. The viewer activates an "info" key on a remote and this activates the context delivery service, which is resident on the viewer's STB. The context delivery service (in the background) contacts a content service of CNN® over the Internet and supplies the current program (News) and date and time of request. This allows CNN® to determine that the clip on the Oscars® was playing when the request for additional content was received. The content service returns to the context delivery service a variety of links or content related to the Oscars'® clip, such as a link to a video on demand (VOD) that is a complete recording of the prior night's Oscars'® show, a link to a half-hour segment of the Oscars® in summary or news clip format, a link to a WWW site or page showing information about the winners of the Oscars®, a link to a listing of the top VOD movies, a link to a VOD clip on Oscars® fashion trends, a link to a VOD clip of the history of the Oscars®, etc. These related links for additional content are simultaneously displayed on the display of the viewer's TV as CNN® continues to play.

In an embodiment, at 260, the context delivery service may detect that a link associated with the additional and related content has been activated by a viewer. This can occur via a remote control device that is used to select and activate a particular link on the display of the TV. In response to the selection, the context delivery service acquires the content associated with the activated link. The content may be downloaded already to a STB of the viewer or to cache or other storage local to the viewer's environment. Alternatively, the content may be dynamically streamed from its external source over a network. The content is then populated, presented, and/or played within a portion of the display.

In one situation, at 261, the current program that was playing when the viewer activated a link for additional content may have occupied a particular or existing location within the display, such that the current program may continue to play in a different relocated position or in a minimized format within the display even while the newly selected additional content is played in the previous display location that the current program played in.

So, the additional content that is dynamically activated by the viewer may swap display locations with the current program or may assume the display location of the current program. When the additional content is selected for play, the current program that was playing may continue to play in a new position or may be paused or stopped and removed from the display altogether or it may appear on the display as a link, which the viewer may reactivate to reacquire the current program when desired.

It is noted, at 270, that the context delivery service may also acquire additional and related information from a variety of information or content services or sources. So, some or portions of the additional content may be acquired from sources that are not related or associated with the current channel provider or the current program. As one example, some of the additional content may be advertisements. These advertisements may include personalized ads and even perhaps coupons or even personalized offers from local merchants (merchants geographically proximate within some predefined range of any given viewer).

Also as another set of optional processing, at 270, the context delivery service may rank order the additional content within the portion of the display. This ranking or ordering may be based on fees paid or agreements made. So, link owners may compete to have their additional content ranked or displayed with a higher order or in a more preferential location with the display of the viewer.

Figure 3:
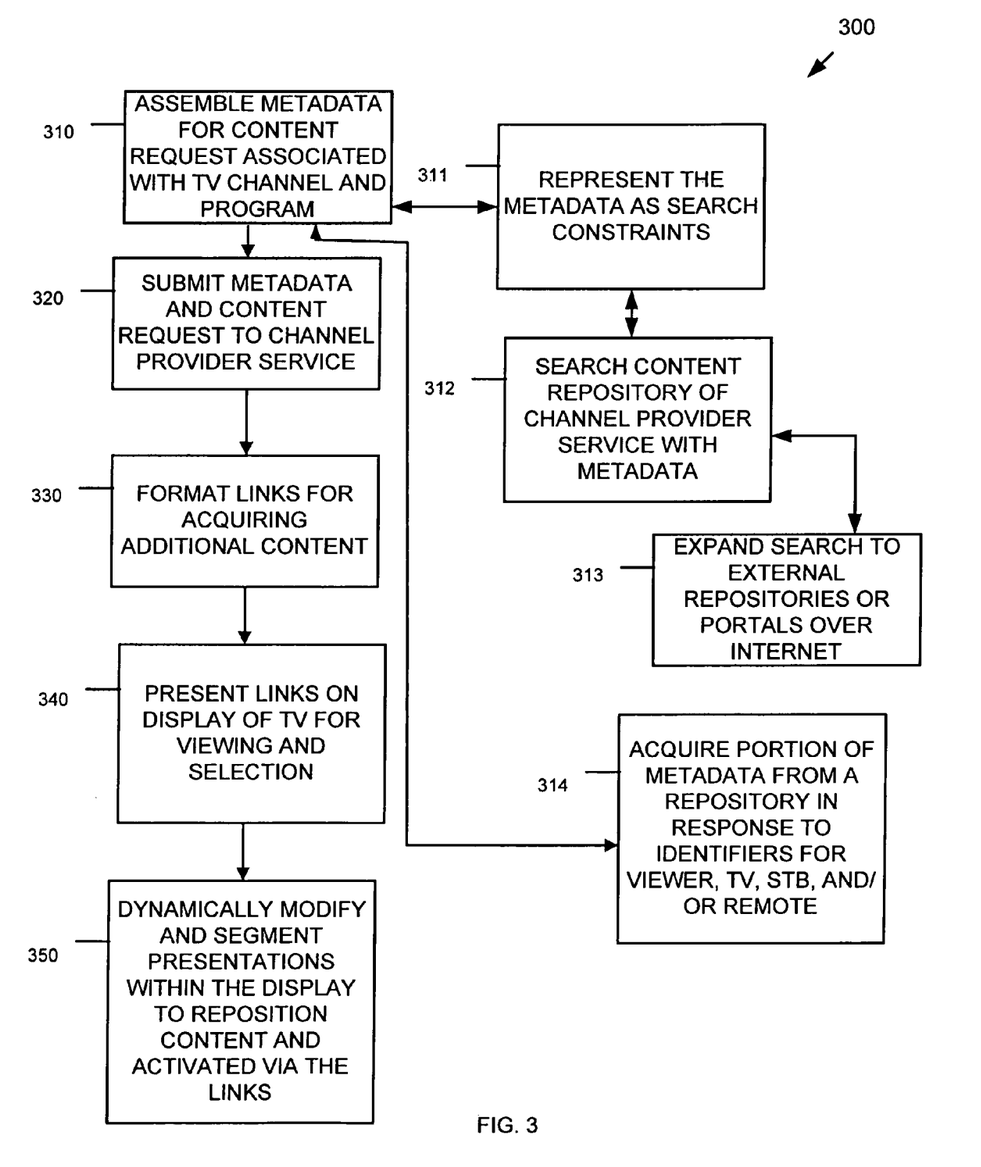
FIG. 3 is a diagram of another method for linking and browsing media within a display of a TV, according to an example embodiment of the disclosure.

FIG. 3 is a diagram of another method 300 for linking and browsing media within a display of a TV, according to an example embodiment of the disclosure. The method (hereinafter referred to as "linking and browsing service") is implemented in a machine-accessible and readable medium and is operational over a network. The network may be wired, wireless, or a combination of wired and wireless. The linking and browsing service presents a different perspective with different aspects for the processing depicted above with respect to the method 200 of the FIG. 2.

At 310, the linking and browsing service assembles metadata for a content request. The content request occurs within the context of a particular channel of a TV and that channel having a particular programming at the time of the request. The content request is an indication that a viewer desires to acquire related content or information associated with the current channel and/or programming associated with the request.

According to an embodiment, the current channel and current programming are dynamically acquired when the content request is made in response to the current tuned channel on the TV and the programming playing thereon. In another embodiment, the viewer may access a TV programming guide and select a specific program or archived program (program previously played); this selection identifies a current or desired channel and a desired program even though the TV may not be tuned to that channel or playing that program. In this manner, the current channel and current program may be viewed as viewer selected channels or programs or may be viewed as dynamically acquired parameters based on a state of the TV when a content request is received from the viewer.

In an embodiment, at 311, the linking and browsing service assembles the metadata as one or more search constraints based on context of a current channel and/or current program at the time of the content request. For example, the metadata may include search constraints related to the viewer (e.g., preferences, profiles, etc.), constraints related to time, constraints related to geographic location, constraints related to a TV service provider, categories associated with the current program, key terms associated with the current program, recent viewing history associated with the TV or the viewer, and the like.

At 312, the search constraints may be used to search content repositories of the current channel provider service with various portions of the metadata. So, if the current channel is CNN®, then metadata, which is assembled in context with the content request, may be used to search a CNN® content repository for additional related content. CNN® may be in a better position to organize and plan for certain additional information or even advertisements to be associated with its programming.

However, at 313, the linking and browsing service may actually expand the request for additional related content beyond the current channel provider. So, a plurality of external repositories or portals may be contacted or consulted over the Internet for purposes of providing other related content to the viewer for a content request. In fact, in some cases, the viewer may have his/her own information repository that is indexed and available for searching, such that this local or perhaps external and personalized repository may be searched to augment the additional content. Thus, a viewer's own library of information may be used to augment content being viewed on the TV.

In yet another embodiment, at 314, various portions of the metadata may be assembled in response to a variety of dynamically acquired information. For example, identifiers may provide profiles or configuration settings and these identifiers may be associated with the viewer, the TV, the STB, the remote device, and the like. A data store, memory, files (e.g., cookies) may be named using the identifiers, such that the linking and browsing service acquires a portion of the metadata for any given content request by acquiring the identifiers and then acquiring the profiles for the parties and devices involved.

At 320, the linking and browsing service submits the metadata and content request to a channel provider service for purposes of acquiring additional content. The channel provider service is associated with the current program and/or the current channel identified in the content request. The processing scenarios with respect to this aspect were discussed at length above with respect to the FIGS. 1 and 2 and with respect to the processing 311-313.

At 330, the linking and browsing service formats the links for acquiring the additional content. So, a search or request of the channel provider service or of other external or perhaps personalized repositories results in an answer set or listing of related content. Each piece of related content is associated with a link and that link is formatted for purposes of descriptively presenting it to the viewer within a display of the TV.

Accordingly, at 340, the links are presented on the display of the TV. The viewer can then select the links as desired. This interaction with the display of the TV permits the viewer to swap in and out content within the display and move content around to various locations within the display. So, at 350, the presentations within the display of the TV are dynamically modified and segmented to reposition content as links are activated vis-à-vis the current program and the vis-à-vis other remaining links that are not selected.

Figure 4:
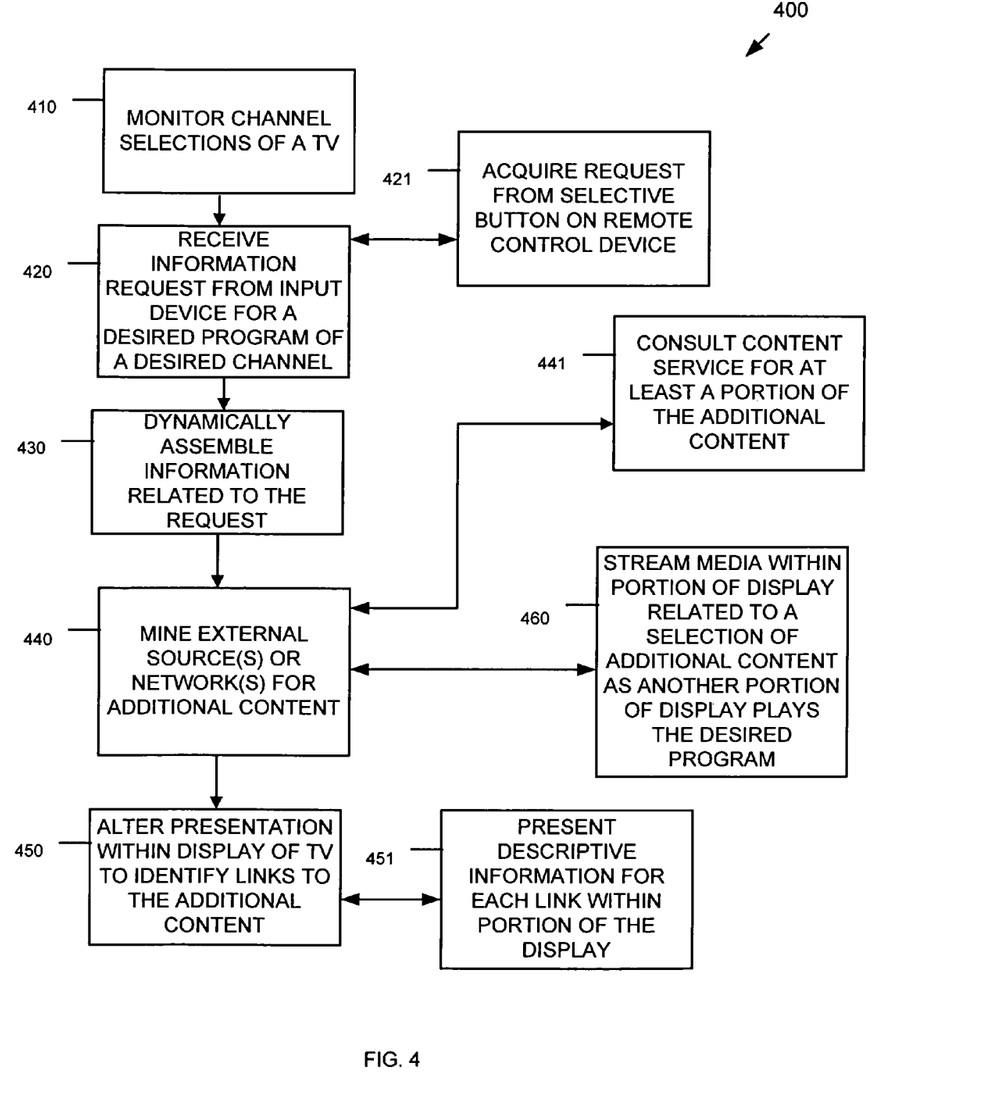
FIG. 4 is diagram of yet another method for linking and browsing media within a display of a TV, according to an example embodiment of the disclosure.

FIG. 4 is diagram of yet another method 400 for linking and browsing media within a display of a TV, according to an example embodiment of the disclosure. The method 400 is implemented as instructions within a machine-accessible medium. The instructions when accessed by a machine perform the processing depicted in FIG. 4. The processing presents another alternative to the aspects presented above with respect to the methods 200 and 300 of the FIGS. 2 and 3.

The instructions may be implemented on a removable medium and subsequently interfaced to a machine where the instructions are uploaded within the machine and processed. Alternatively, the instructions may be prefabricated within memory or storage of the machine and loaded for execution when the machine is initiated or booted. In still another arrangement, the instructions may be downloaded from a network storage location or other network machine to a target machine on the network and processed. In yet another situation, the instructions may be remotely processed over a network on one machine at the instruction and on behalf of another different network machine.

At 410, the instructions monitor channel selections of a particular TV. At 420, the instructions receive an information request from an input device for a desired program or a desired channel. The information request instruction originates from a viewer that is watching the TV. In an embodiment, at 421, the request is acquired from a selective button on a remote control device associated with the TV and/STB of the viewer.

At 430, the instructions dynamically assemble information related to the request. That is, context information associated with what was being viewed or selected on the TV and information related to the environment and/or profiles of the viewer and the parties or devices involved are used to assemble a search request or information related to the request.

At 440, the instructions dynamically and in real time mine external sources or networks for additional content related to the desired program and/or desired channel associated with the viewer's content request. The assembled information, acquired in context, at 430 is used to mine the external sources or networks for the additional content.

According to an embodiment, at 441, the instructions may dynamically consult the channel provider service associated with the desired channel and/or desired program for at least a portion of the additional content. It is noted, that the instructions may also mine local sources, such as personalized data repositories of the viewer for some aspects of the additional content. Moreover, a variety of external sources may be consulted for some aspects of the additional content; some of these sources may be entirely unrelated to the channel provider service.

At 450, the presentation within the display of the TV is dynamically altered to identify links to the additional content for the user as or while the user continues to view what was playing on the TV at the time the content request was made. At 451, the links are presented with descriptive information, such that the viewer can readily discern what the content of the links is and decide whether the viewer wants to activate or view the content.

According to an embodiment, at 460, the instructions may dynamically and simultaneously stream media within a portion of the display, which is related to a selection of the additional content, while the desired program continues to play in a different portion of the display. A variety of display configurations may occur as additional content is presented as links and selected for viewing within the display. One example view is presented for purposes of illustration in FIG. 5.

Figure 5:
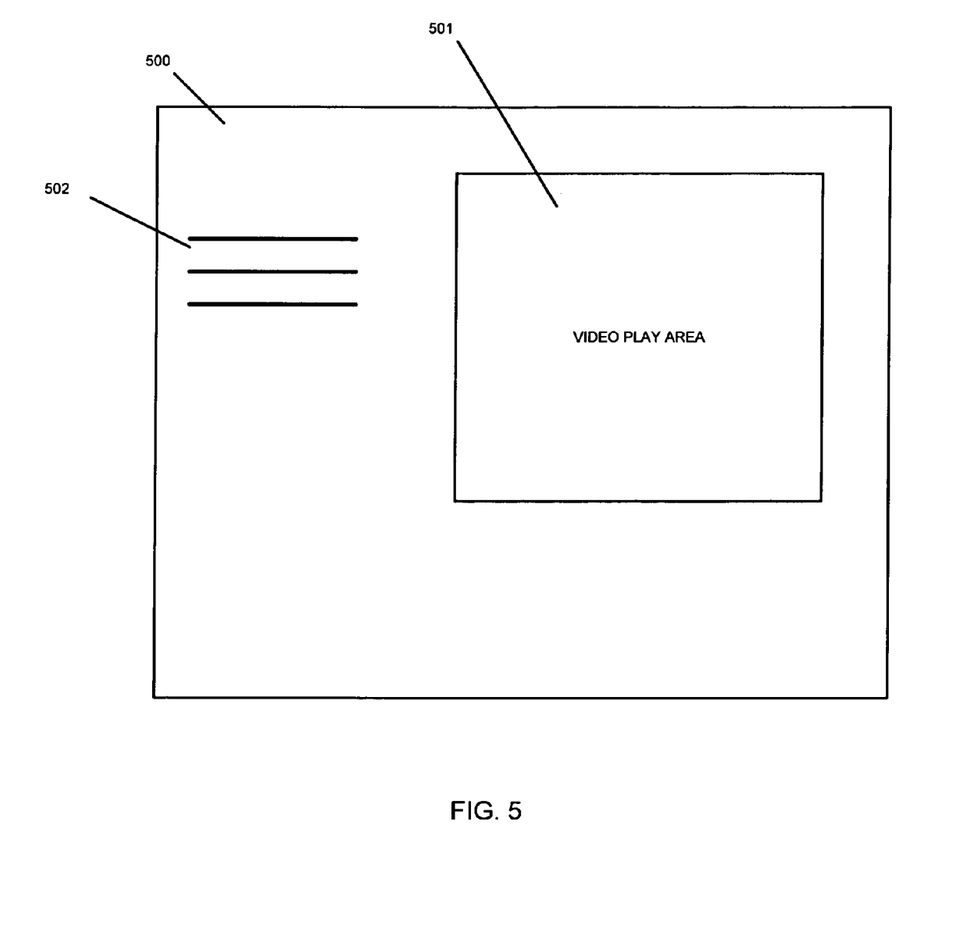
FIG. 5 is a diagram of an example presentation within a display of a TV depicting links for browsing and simultaneously viewing a current program playing, according to an example embodiment of the disclosure.

FIG. 5 is a diagram of an example presentation within a display 500 of a TV depicting links 502 for browsing and simultaneously viewing a current program playing 501, according to an example embodiment of the disclosure. FIG. 5 is presented for purposes of illustration only and presents an example configuration of a display that may be presented to a viewer in response to the techniques presented herein.

The video display area 501 may be used to present video that the viewer is playing. This may be a live TV feed from a current channel or may be a VOD selection or a previously recorded program that the user is playing. The video display area 501 may also play video from an external source of the viewer, such as a media player, camera, etc.

Initially, the viewer may have the TV tuned to a given channel or may be playing a desired program from a given channel or from an external source. When the viewer activates a request via a remote control device, then the processing and techniques presented herein and above take place and the display 500 of the TV is altered. At this point in time, the current program that was playing continues to play in area 501; the additional related content is also presented as descriptive links 502 within the display 500. The viewer may use the remote control to then select a given one of the links 502, this may result in a different video or piece of content being played or presented in area 501, and the previous playing program may be paused and/or presented as a link 502 for reselection if desired by the viewer.

It is to be understood, that the display 500 may include more than one video play area 501, such that two or more videos may be playing at the same time on the display 500. It is also understood that any configuration and presentation may be achieved or customized to the liking or preference of the viewer.

Figure 6:
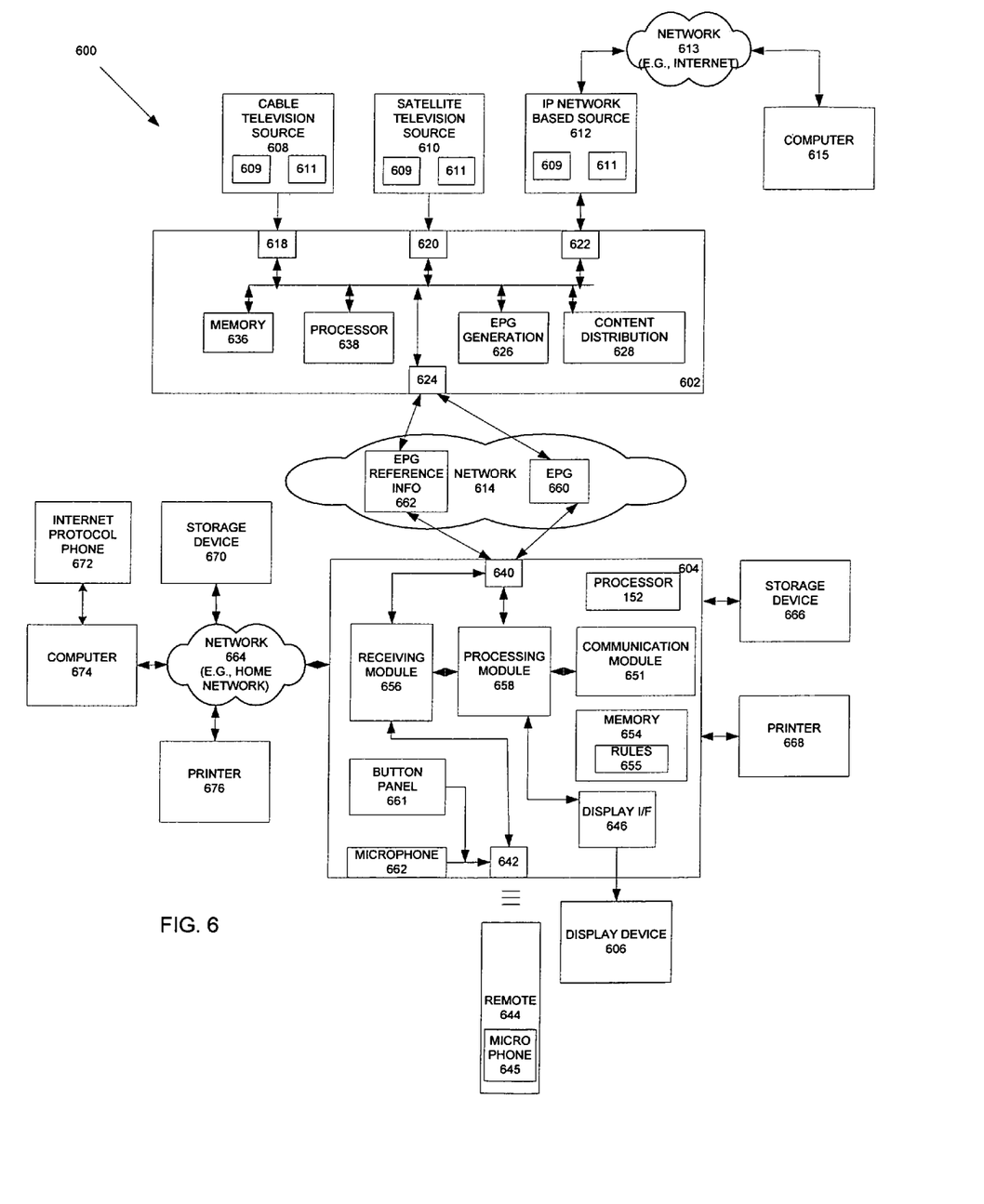
FIG. 6 is a diagram of an example network architecture for devices, machines, services, systems, and instructions to interact and perform any one or more of the methodologies discussed herein, according to an example embodiment of the disclosure.
Figure 7:
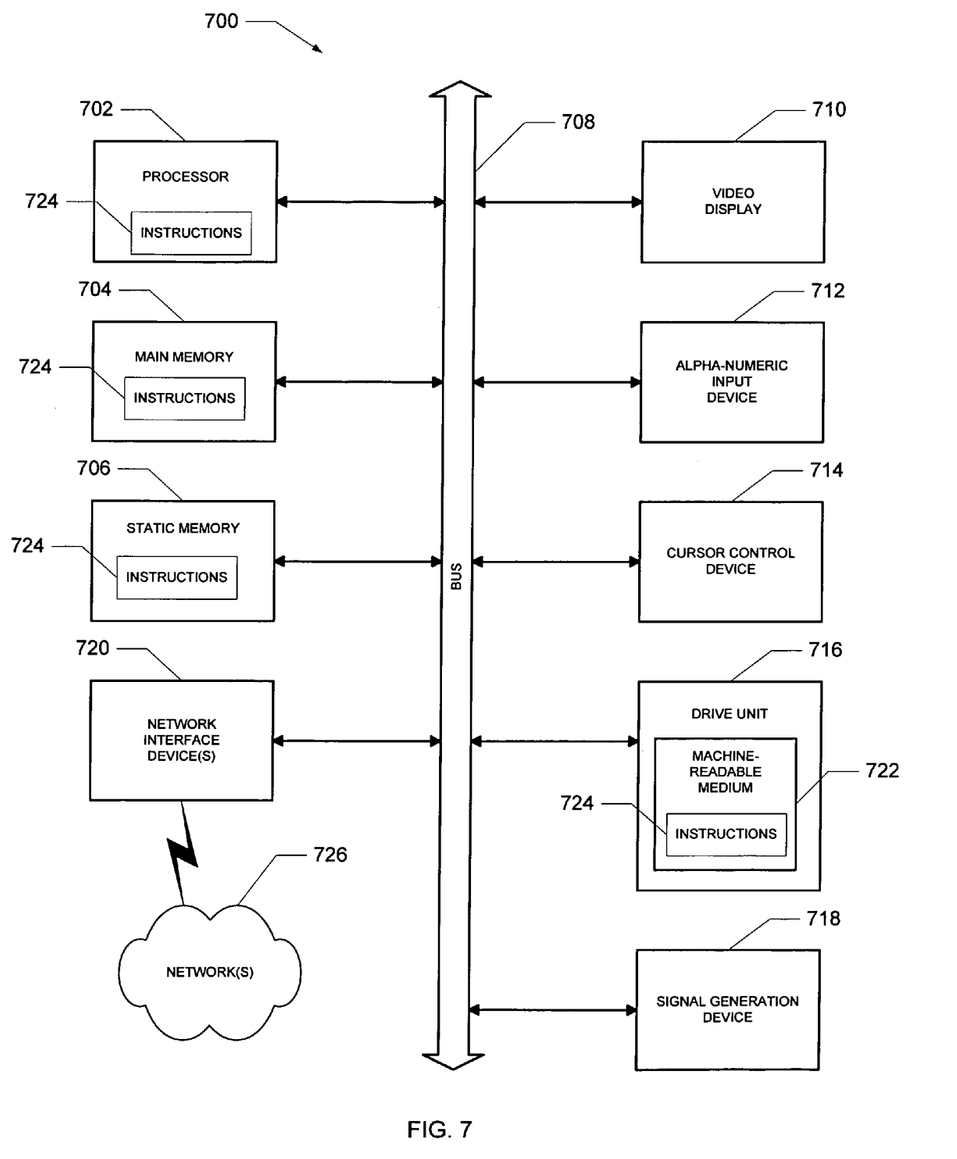
FIG. 7 is a diagram of an example machine architecture within which a set of instructions for causing the machine to perform any one or more of the methodologies discussed herein may be executed, according to an example embodiment of the disclosure.

FIGS. 6-7 are now presented for purposes of providing an example network architecture and machine architecture for which devices can interact to achieve the teachings and techniques presented herein. This layout and configuration is presented for purposes of illustration only and is not intended to limit the embodiments presented herein.

FIG. 6 is a diagram of an example network architecture 600 for devices, machines, services, systems, and instructions to interact and perform any one or more of the methodologies discussed herein, according to an example embodiment of the disclosure.

FIG. 6 may also be viewed as an example multimedia distribution system 600 that is implemented in accordance with at least one embodiment of the present disclosure. As shown, the system 600 includes a multimedia content provider 602, a set-top box 604, a display device 606, a plurality of multimedia content sources, such as cable television source 608, satellite television source 610, and IP network-based source 612.

In the illustrated embodiment, the content provider 602 and the set-top box 604 are connected via a network 614, where the network 614 can include a cable television distribution network, a satellite distribution network, a broadcast television distribution network, a data packet-based computer network (e.g., an Ethernet network), and the like. Likewise, the content sources 608, 610, and 612 may be connected via one or more networks to the content provider 602.

As shown, the content provider 602 can include one or more interfaces 618, 620, and 622 to interface with the content sources 608, 610, and 612, respectively, and an interface 624 to interface with the set-top box 604 via the network 614. The interfaces 618, 620, 622, and 624 may include any of a variety of interfaces, such as a coaxial cable interface, a wireless interface for receiving satellite or broadcast transmissions, or a data packet network interface, such as an Ethernet interface or a router. The IP Network based source 612 is shown to be connected to a computer 615 over a network 613 (e.g., Internet) thereby providing a communication path between a user operating the set-top box 604 and a user operating the computer 615. The content provider 602 further may include an EPG generation module 626 and a multimedia content distribution module 628. The modules 626 and 628 may be implemented as software, hardware, firmware, or combinations thereof. To illustrate, the content provider 602 may include a memory 636 (e.g., static random access memory (SRAM)) and one or more processors 638, where the modules 626 and 628 may be implemented in part or in whole as executable instructions stored in the memory 636 and executed by the processor 638 to perform the techniques described herein.

As also shown, the set-top box 604 may include an interface 640 for interfacing with the content provider 602 via the network 614, a control interface 642 to receive user input and commands, (e.g., via a remote control 644, a button panel 661, a microphone 662) and a display interface 646 to interface with the display device 606. The interface 640 may include any of a variety of appropriate interfaces, such as a coaxial cable interface, a wireless interface to send and receive wireless transmissions, or a data packet-based network interface, such as an Ethernet interface. The control interface 642 may include any of a variety of interfaces, such as an infrared interface, a wireless interface, or the button panel 661. The remote control 644 is shown to include a microphone 645 for receiving voice commands and the set-top box 604 is also shown to include a microphone 662 for receiving voice commands.

The set-top box 604 is further shown to be connected to a storage device 666 (e.g., hard disk, compact disk, floppy, universal serial bus key, etc.) for storing files, a printer 668 for printing files, and a network 664 (e.g., home network). The network 664, in one embodiment, may connect the set-top box 604 to a computer 674 that is connected to an internet protocol phone 672, a storage device 670 for storing electronic files, and a printer 676. The set-top box 604 further may include a processing module 658, a receiving module 656, and a communication module 651. The processing module 658, receiving module 656, and communication module 651 may be implemented as hardware, software, firmware, or combinations thereof. To illustrate, the set-top box 604 may include a memory 654 and one or more processors 652, where one or both of modules 648 and 650 are implemented as executable instructions stored in memory 654 and executed by the processor 652 to implement techniques described herein. The memory is further shown to include rules 655 that may be utilized to control the use of images that may be captured from content that is displayed on the display device 606. For example the rules 655 may embodied as a digital rights management license that may be distributed with content from the content source 608, 610, and 612. As is well known in the art, the license may include rules 655 that may restrict the use of the associated content.

In a particular embodiment, the content provider 602 receives data representative of multimedia channels from each of the different content sources 608, 610, and 612, and provides data representative of at least a subset of the multimedia channels to the set-top box 604 for processing and display at the display device 606 and/or output via an audio device (not shown). In one embodiment, the content provider may include a content module 609 that communicates data that includes content and a control module 611 that may communicate data that includes control information (e.g., digital license) that may include a rule that restricts the use of associated content. Moreover, in a particular embodiment, the content provider 602 may provide data representative of an electronic programming guide (EPG) 660 to the set-top box 604 for processing by the processing module 658 and for navigation by a user via the control interface 642 and the processing module 658. As described herein, the EPG 660, in one embodiment, represents a unified EPG including listings for the multimedia channels provided by two or more content sources that provide multimedia channels to the content provider 302. To illustrate, in a particular embodiment, the EPG 360 represents a navigable program guide or user interface whereby a user, via the remote control 644 or other input device, can direct the processing module 650 to navigate between multimedia channels by selecting an icon or other graphical representation of the desired channel as represented by a graphical display of the EPG 660. The EPG 660 may combine representations of all of the multimedia channels from different content sources in a single list or different lists for different content sources may be displayed concurrently by the EPG 660. Moreover, multimedia channels may be organized within the EPG 660 based on any of a variety of characteristics, such as by the program content of the multimedia channels, where the program content describes the genre or categorization of the video/audio program represented by the multimedia channel. Examples of various genres or categories include a "comedy" genre, an "action" genre, a "family" genre or "children" genre, a "romance" genre, a "science-fiction" genre, and the like.

FIG. 7 is a diagram of an example machine architecture within which a set of instructions for causing the machine to perform any one or more of the methodologies discussed herein may be executed, according to an example embodiment of the disclosure.

Accordingly, FIG. 7 shows a diagrammatic representation of machine in the example form of a computer system 700 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method comprising:
receiving, by a processor of a set top box, a program from equipment of one of a plurality of channel providers that supply programs to a broadcaster;
presenting, by the processor, the program at a display coupled to the set-top box, wherein the program is presented in a video display area;
receiving, by the processor, an information request based on receiving an input via a remote control device;
detecting, by the processor, a date and a time the information request was received, a current elapsed time into a playing of the program, and an identifier of the program;
assembling, by the processor, metadata comprising the date and the time the information request was received and the identifier of the program;
transmitting, by the processor, the metadata to equipment of the channel provider that supplied the program to enable the channel provider to determine the context of what was being presented by the program when the information request was received and to identify additional content related to the context of what was being presented by the program at the current elapsed time into the playing of the program;
receiving, by the processor, from the equipment of the channel provider the additional content related to the context of what was being presented by the program at the date and time the request was received and at the current elapsed time into the playing of the program and obtained from one of a world wide web service associated with the channel provider and an Internet portal associated with the channel provider, wherein at least a portion of the additional content is content being currently played on another channel, and wherein the additional content includes archived television programs and geographic maps selected according to the context;
presenting, by the processor, selectable links to enable a presentation of at least a portion of the additional content within the display, wherein the selectable links are presented in a link display area that is outside of the video display area;
detecting, by the processor, a selection of a link from among the selectable links;
acquiring, by the processor, content from among the additional content that corresponds to the selected link;
presenting, by the processor, in the video display area the acquired content in response to the detecting of the selection of the link;
removing, by the processor, the selected link from the link display area in response to the detecting of the selection of the link;
ceasing, by the processor, to present the program in the video display area in response to the detecting of the selection of the link;
in response to the detecting of the selection of the link, generating, by the processor, another selectable link for reinstating presentation of the program in the video display area upon selection of the other selectable link; and
presenting, by the processor, the other selectable link with the selectable links in the link display area without presenting any images of the program.

2. The method of claim 1, comprising:
presenting the acquired content in accordance with digital rights management rules distributed with streamed content from an Internet Protocol networked based television source.

3. The method of claim 1, further comprising, identifying a plurality of different content types to associate with the selectable links received from the channel provider, wherein the different content types comprise content related to at least one of video on demand content, a universal resource identifier for a world-wide web site, personalized content related to a personal multimedia store of a viewer, advertisements, personal advertisements, or streaming media content accessible from the Internet.

4. The method of claim 1, further comprising, augmenting the additional content with more related content from other content sources or other services and generating other selectable links for presenting at the display.

5. The method of claim 1, further comprising, ranking and ordering the selectable links presented at the display.

6. The method of claim 5, further comprising, determining the ranking and ordering in response to fees paid by or agreements made with link owners associated with the selectable links.

7. A method comprising:
receiving, by a processor of a set top box, a content request from a remote control device in communication with the set-top-box;
assembling, by the processor, metadata responsive to the content request via the set-top-box, wherein the metadata comprises a date and time when the content request was received, a current elapsed time into a playing of a program being presented, and an identifier of the program being presented on a display at the date and time the content request was received to enable a channel provider that supplied the program to identify a context of what was being presented by the program at the date and the time when the content request was received and at a current elapsed time into the playing of the program being presented;

submitting, by the processor, the metadata to the channel provider;

presenting, by the processor, selectable links on the display for viewing additional content, wherein at least a portion of the additional content is obtained from one of a world wide web service associated with the channel provider or an Internet portal associated with the channel provider according to the context of the program using at least the metadata, wherein at least a portion of the additional content is content being currently played on another channel, and wherein the additional content includes at least one of archived television programs or geographic maps selected according to the context;

removing, by the processor, the program from the display upon a user selection of one of the selectable links;

receiving, by the processor, from a web-based service, streamed content related to the selected link;

presenting, by the processor, the streamed content at the portion of the display previously occupied by the program; and presenting, by the processor, another selectable link for reinstating presentation of the program, wherein the other selectable link is presented without presenting any images of the program.

8. The method of claim 7, further comprising transmitting the metadata with geographic constraints and at least one of preference constraints for a viewer, temporal constraints, television service provider constraints, categories associated with the program, key terms associated with the program, or recent viewing history associated with the set-top box or the viewer.

9. The method of claim 8, wherein the channel provider searches a content repository according to the context determined for the program.

10. The method of claim 9, wherein the channel provider searches external repositories or portals.

11. The method of claim 7, wherein the selectable links and the other selectable link are presented in a link display area that is outside of a video display area in which the program is presented.

12. The method of claim 7, further comprising acquiring at least a portion of the metadata from a repository in response to an identifier associated with at least one of a viewer, a television, the set-top box, or the remote control device.

13. A non-transitory computer-readable storage medium comprising computer instructions, which responsive to being executed by a processor cause the processor to perform operations comprising:

receiving a content request from a remote control device in communication with the set-top-box;

assembling metadata responsive to the content request via the set-top-box, wherein the metadata comprises a date and time when the content request was received, a current elapsed time into a playing of a program being presented, and an identifier of the program being presented on a display at the date and time the content request was received to enable a channel provider that supplied the program to identify a context of what was being presented by the program at the date and the time when the content request was received and at a current elapsed time into the playing of the program being presented;

submitting the metadata to equipment of the channel provider;

presenting selectable links on the display for viewing additional content, wherein at least a portion of the additional content is obtained from one of a world wide web service associated with the channel provider or an Internet portal associated with the channel provider according to the context of the program using at least the metadata, wherein at least a portion of the additional content is content being currently played on another channel, and wherein the additional content includes at least one of archived television programs or geographic maps selected according to the context;

removing the program from the display upon a user selection of one of the selectable links;

receiving from a web-based service, streamed content related to the selected link;

presenting the streamed content at the portion of the display previously occupied by the program; and presenting another selectable link for reinstating presentation of the program, wherein the other selectable link is presented without presenting any images of the program.

14. The non-transitory computer-readable storage medium of claim 13, wherein the selectable links and the other selectable link are presented in a link display area that is outside of a video display area in which the program is presented.

* * * * *